United States Patent Office 3,490,390
Patented Jan. 20, 1970

3,490,390
PELLETING MACHINES
Andries Pretorius Du Toit, Meadowridge, Cape Province, Republic of South Africa, assignor to Randmaker Implements (Proprietary) Limited
Filed Feb. 6, 1968, Ser. No. 703,341
Int. Cl. A23n 17/00
U.S. Cl. 107—14
10 Claims

ABSTRACT OF THE DISCLOSURE

The invention concerns a pelleting machine of the kind used more particularly for the pelleting of milled vegetable matter to provide fodder for farm animals. It comprises a rotatably mounted die ring having a plurality of circumferentially spaced radial extrusion passages passing through it and at least one plunger roller located within the die ring and having a plurality of spaced radial plunger pins arranged to mesh gear tooth fashion with the extrusion passages of the die ring.

---

This invention relates to improvements in pelleting machines of the kind commonly used for the pelleting of milled vegetable matter for the production of feeds for farm animals.

According to the invention, a pelleting machine comprises a rotatably mounted die ring having a plurality of circumferentially spaced radial extrusion passages passing through it, at least one plunger roller located within the die ring and having a plurality of spaced radial plunger pins extending from its periphery and arranged to mesh gear tooth fashion with the inner ends of the extrusion passages in the die ring, so that on rotation of the die ring and plunger roller, milled material fed to the inside of the die ring, is extruded through the extrusion passages by the successive engagement of the plunger pins with the inner ends thereof, which ends are flared to prevent any binding action taking place, between the engaging parts.

Either the die ring or the or each plunger roller or both may be driven, but preferably the die ring will be the driven member and the or each plunger roller will be mounted for free rotation such as on a fixed shaft.

Conveniently the machine is operated with the axes of die ring and plunger roller or rollers vertically disposed. The bottom side of the interior space of the die ring is closed off while a feed opening for the material to be pelleted is provided on the top side thereof.

In a convenient arrangement two plunger rollers are located within the die ring diametrically opposite one another, so as thereby to equalize the pressures generated by the opposing extruding actions of the plunger pins on the compacted material being forced through the extrusion passages. More than two plunger rollers may provided.

The radial dimensions of the die ring and the plunger rollers are so arranged that the number of extrusion passages in the die ring and the number of plunger pins on each such roller, is in a specific predetermined ratio, equal to the ratio of the pitch circle diameters of the die ring and rollers respectively.

The plunger pins may be removably secured in a plunger for easy replacement when required. According to one method a plunger roller includes two parts arranged to be clamped together to secure the plunger pins in their circumferentially spaced operative positions.

Figure 1:
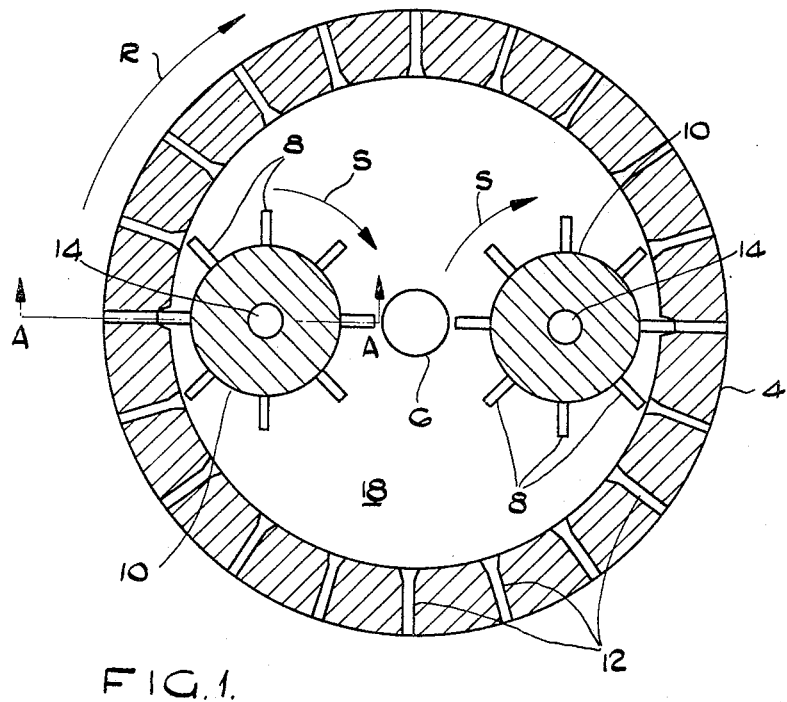
Figure 2:
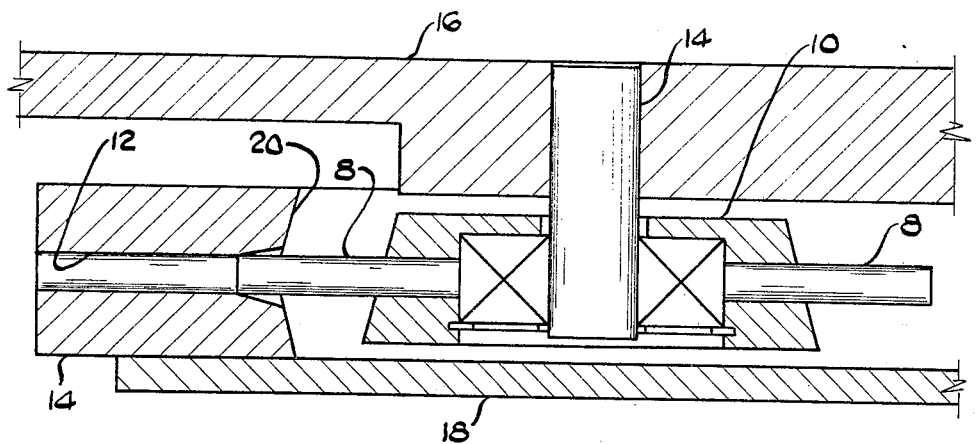

To enable the invention to be more clearly understood, and carried into practice, reference is now made to the accompanying drawings in which:

FIGURE 1 is a sectional plan view showing the essential parts of a pelleting machine constructed according to the invention;
FIGURE 2 is a fragmentary vertical cross-sectional view taken on line A—A of FIGURE 1 and drawn to an enlarged scale, and
FIGURE 3 is a part-sectional view showing a method of constructing a plunger roller in which the plunger pins are readily replaceable after wear.

Referring to the drawings, reference 4 denotes the die ring which is arranged to be rotated about the axis of the shaft 6 in the direction of the arrow R, so that, due to the meshing engagement of the plunger pins 8 of the plunger rollers 10 with the flared ends of the circumferentially spaced extrusion passages 12, the plunger rollers are caused to rotate in the directions of the arrows S. Each of the two plunger rollers 10 is mounted for free rotation on a fixed shaft 14 held in a frame member 16. The bottom side of the die ring 4 is closed by a base plate 18 which, with the vertical inner wall of the die ring, provides a space to receive the material to be pelleted, which is fed through its upper open side.

To prevent pressure build-up and compaction of the material in the dead areas, that is the areas between the plunger rollers 10, each roller is of frusto-conical form as shown in FIGURE 2, so that the tendency is for the material to be displaced upwardly. The inner surface of the die ring 4 is provided with a concave annular recess 20, which will cause the material to flow towards the flared inner ends of the extrusion passages 12, under the centrifugal force acting on the material within the rotating die ring 4.

Figure 3:
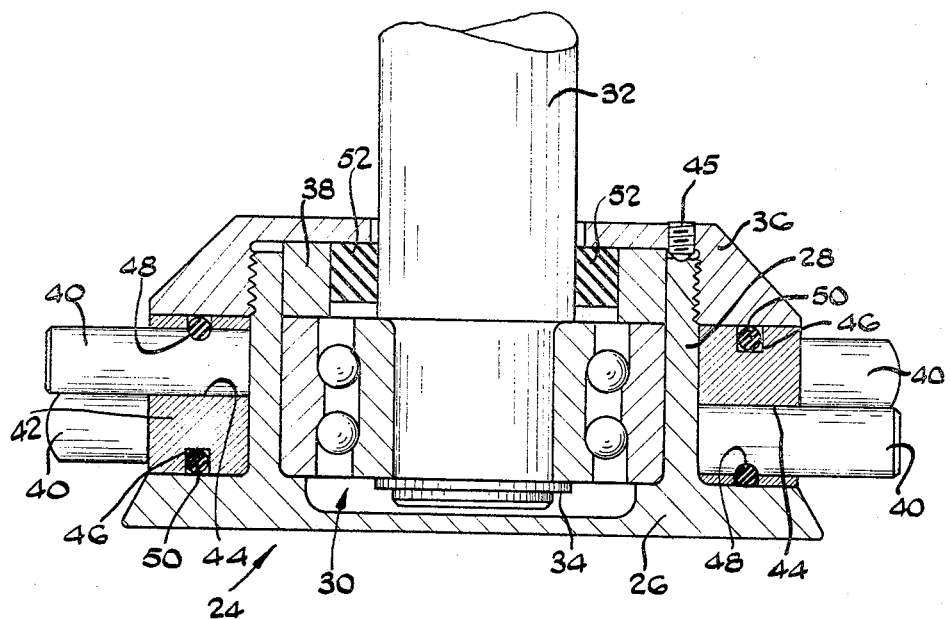

Reference is now made to FIGURE 3 of the drawings which shows a method of constructing the plunger rollers to enable the plunger pins thereof to be readily replaced such as when they become worn out or damaged.

The roller as shown comprises a body part 24 having a base 26 with an annular wall 28 extending from it and enclosing a central bearing recess in which a ball bearing 30 is snugly located. The reduced end of a roller axle pin 32 engages with the inner race of the ball bearing 30 and is secured therein with the circlip 34. A screw-on cover flange 36 engages with the top screw-threaded end of the annular wall 28 and, besides closing off the bearing recess, acts through the spacer ring 38 to fix the outer race of the ball bearing 30, and additionally clamps the removable plunger pins 40 in their spacing and locating ring 42. The cover flange 36 is secured by one or more grub screws 42, and also locates a sealing ring 52.

The locating ring 42 is provided with a plurality of accurately spaced radial holes 44 which are staggered circumferentially and in which the plunger pins 40 are a snug sliding fit.

On each side of the locating ring 42 an annular groove 46 is provided which breaks into the holes 44 for a short distance. The inner end of each plunger pin 40 is provided with a transverse notch 48 positioned so that when all the plunger pins 40 are inserted in their holes 44 and correctly orientated, locking rings 50 inserted in the grooves 46 will engage with the transverse notches of all the plunger pins 40 and, due to the clamping action of the cover 36, will thereby lock all the plunger pins in position as shown. A grub screw 45 locks the cover flange 36.

When this construction of plunger roller is used the extrusion passages 12 in the die ring 4 will of course have to be staggered to conform accurately with the staggered setting of the plunger pins 40 in this modified construction of the plunger roller.

The plunger rollers are so dimensioned and positioned within the die ring as to allow sufficient clearance between their peripheries and the inside surface of the die ring so as to prevent compaction of material between these surfaces when the machine is in operation. To ensure that there is no pressure build-up between the roller peripheries and the die ring dead areas, i.e. the areas between the flared ends of the extrusion passages, the body of each roller may be made of frusto-conical form so that material trapped between the roller peripheries and the dead areas on the inside surface of the die ring, will tend to be displaced upwardly and not compacted to an unwanted extent.

Suitable collecting means such as an annular tray or hopper may be located below the periphery of the die ring so as to collect the pelletised material as it is projected from the outer ends of the extrusion passages.

It has been found that the piston-like action of the plunger pins 8 gives a positive displacement of milled material fed to the machine as well as a shearing action; whereby use can be made of milled material of a coarser nature than normally used in known pelleting machines.

It has also been found that by concentrating the generated pressure applied to the rollers on the die ring, only on the material being treated in the extrusion passages in the die ring, the heat generation, and, consequently, power consumption, is much lower than for known pelleting machines, which tend to compact the material between the roller peripheries and die ring dead areas.

I claim:

1. A pelleting machine which comprises a rotatably mounted die ring having a plurality of circumferentially spaced radial extrusion passages passing through it, a plunger roller located within the die ring and having a roller body and a plurality of spaced radial plunger pins extending from the peripheral surface of the roller body and arranged to mesh gear tooth fashion with the inner ends of the extrusion passages in the die ring so that, on rotation of the die ring and plunger roller, milled material fed to the inside of the die ring is extruded through the extrusion passages by the successive engagement of the plunger pins with said inner ends, the plunger pins being elongated in form and only the tips thereof entering said inner ends whereby the roller body is spaced from the die ring so to allow sufficient clearance between said peripheral surface of the roller body and the inside surface of the die ring to prevent compaction of material between these surfaces when the machine is in operation.

2. A pelleting machine as claimed in claim 1, wherein the plunger pins are removably secured in a plunger roller for easy replacement.

3. A pelleting machine which comprises a rotatably mounted die ring having a plurality of circumferentially spaced radial extrusion passages passing through it, a plunger roller located within the die ring and having a roller body and a plurality of spaced radial plunger pins extending from the peripheral surface of the roller body and arranged to mesh gear tooth fashion with the inner ends of the extrusion passages in the die ring so that, on rotation of the die ring and plunger roller, milled material fed to the inside of the die ring is extruded through the extrusion passages by the successive engagement of the plunger pins with said inner ends, said roller body being of frusto-conical form so that material trapped between the said peripherial surface and the dead areas which exist between said inner ends of adjacent extrusion passages tends to be displaced upwardly and not compacted to an undesirable extent thereby to ensure that there is no pressure build-up between said peripheral surface and the die ring dead areas.

4. A pelleting machine as claimed in claim 3, wherein said plunger pins are of cylindrical form and are fairly widely spaced apart in the circumferential direction.

5. A pelleting machine as claimed in claim 3, wherein the inner surface of the die ring has a concave annular recess so that the material being treated will tend to flow towards the flared entrances to the extrusion passages, under the centrifugal force acting on the material within the rotating die ring, in readiness to be pressed into and extruded from the outer ends of the extrusion passages by the plunger pins.

6. A pelleting machine which comprises a rotatably mounted die ring having a plurality of circumferentially spaced radial extrusion passages passing through it, at least one plunger roller located within the die ring and having a plurality of spaced radial plunger pins extending from its periphery and arranged to mesh gear tooth fashion with the inner ends of the extrusion passages in the die ring so that, on rotation of the die ring and plunger roller, milled material fed to the inside of the die ring is extruded through the extrusion passages by the succesive engagement of the plunger pins with the inner ends thereof, the plunger roller including two parts clamped together to secure the plunger pins in their circumferentially spaced operative position.

7. A pelleting machine as claimed in claim 6, wherein a plunger pin locating ring having circumferentially spaced radial holes therein in which the inner ends of the plunger pins are a snug sliding fit, is interposed between the said two parts and which locating ring is provided with locking apertures which communicate with each of the radial holes, locking elements adapted to engage with these locking apertures and with recesses provided in the inner ends of the plunger pins, which locking elements are held in position by the two parts effecting the clamping action and thereby secure the plunger pins in their operative positions.

8. A pelleting machine as claimed in claim 7, wherein the locking apertures are formed by providing an annular groove in a side of the plunger pin locating ring, wherein the recesses in the inner ends of the plunger pins are constituted by transverse notches, and wherein a locking element comprises a locking ring insertable in the said annular groove so that it engages with the transverse notches in the plunger pins.

9. A pelleting machine as claimed in claim 7, wherein the two parts of the plunger roller which effect the clamping action engage with one another by screw-threaded means.

10. A pelleting machine as claimed in claim 9, wherein one of the said two parts constitutes a body part of the plunger roller and comprises a base upstanding from one side of which and disposed inwardly of the periphery thereof so as to leave an annular flange, is an annular wall enclosing a central bearing recess, wherein the other of the two parts is a cover flange screw-threadedly engageable with the free end of the annular wall, and wherein the plunger pin locating ring is slidable over the annular wall and is clampable between the annular flange of the base and the screw-on cover flange.

References Cited
UNITED STATES PATENTS

| | | | |
|---|---|---|---|
| 1,238,981 | 9/1917 | Barton. | |
| 1,283,123 | 10/1918 | Erkelens | 29—121 |
| 1,804,283 | 5/1931 | Sizer | 107—8 |
| 3,234,894 | 2/1966 | Dechert | 107—14 |
| 3,327,653 | 6/1967 | Crane | 107—14 |

BILLY J. WILHITE, Primary Examiner

U.S. Cl. X.R.

18—12